(12) United States Patent
Johansson et al.

(10) Patent No.: US 6,439,651 B1
(45) Date of Patent: Aug. 27, 2002

(54) ARRANGEMENT FOR CABS FOR VEHICLES

(75) Inventors: Daniel Johansson, Skärholmen; Olof Ostensson, Kalmar, both of (SE)

(73) Assignee: Scania CV AB (publ) (CH)

(*) Notice: Subject to any disclaimer, the term of this patent is extended or adjusted under 35 U.S.C. 154(b) by 0 days.

(21) Appl. No.: 09/913,255

(22) PCT Filed: Feb. 11, 2000

(86) PCT No.: PCT/SE00/00275

§ 371 (c)(1),
(2), (4) Date: Aug. 10, 2001

(87) PCT Pub. No.: WO00/47455

PCT Pub. Date: Aug. 17, 2000

(30) Foreign Application Priority Data

Feb. 12, 1999 (SE) .............................................. 9900506

(51) Int. Cl.$^7$ .................................................. B60J 7/00
(52) U.S. Cl. .............................. 296/190.07; 296/35.1; 180/89.12; 180/89.13; 180/89.14; 180/89.15
(58) Field of Search .................... 296/190.07, 35.1; 180/89.14, 89.15, 89.12, 89.16

(56) References Cited

U.S. PATENT DOCUMENTS

| | | | | |
|---|---|---|---|---|
| 3,642,316 A | * | 2/1972 | Porth et al. | 296/190.05 |
| 3,649,066 A | * | 3/1972 | Steiner et al. | 296/35.1 |
| 3,765,500 A | * | 10/1973 | Reeves | 180/89.15 |
| 3,819,225 A | * | 6/1974 | Carlisle et al. | 180/89.14 |
| 3,944,017 A | * | 3/1976 | Foster | 296/190.07 |
| 3,958,659 A | * | 5/1976 | Selman | 296/190.07 |
| 4,279,321 A | * | 7/1981 | Stone | 180/89.14 |
| 4,366,879 A | * | 1/1983 | Nordell | 180/89.15 |
| 4,372,411 A | * | 2/1983 | Flower | 296/190.07 |
| 4,452,329 A | * | 6/1984 | Stone et al. | 296/190.07 |
| 4,463,818 A | * | 8/1984 | Sonneborn | 180/89.15 |
| 4,871,189 A | * | 10/1989 | Van Breemen | 180/89.12 |
| 4,989,684 A | * | 2/1991 | Conaway | 296/190.07 |
| 5,209,316 A | * | 5/1993 | Bauer | 180/89.14 |
| 5,398,774 A | * | 3/1995 | Nilsson et al. | 296/190.07 |
| 6,073,714 A | * | 6/2000 | McHorse et al. | 180/89.13 |
| 6,206,121 B1 | * | 3/2001 | Michel | 296/190.07 |

FOREIGN PATENT DOCUMENTS

| | | | |
|---|---|---|---|
| DE | 39 28945 | * | 3/1991 |
| DE | 40 15011 | * | 7/1991 |
| DE | 42 14219 | * | 11/1993 |
| EP | 0095633 | | 7/1983 |
| EP | 0213098 | | 3/1987 |
| EP | 0 521 303 | * | 6/1992 |
| GB | 1399611 | | 7/1975 |

* cited by examiner

*Primary Examiner*—Stephen T. Gordon
*Assistant Examiner*—Kiran B. Patel
(74) *Attorney, Agent, or Firm*—Ostrolenk, Faber, Gerb & Soffen, LLP

(57) ABSTRACT

A vehicle cab is resiliently suspended on a vehicle frame. Between the cab and the frame is arranged a device for limiting the mobility of the cab relative to the frame during operation and upon tilting of the cab. The device incorporates two stop surfaces fastened to the cab, and a movement limiter fastened to a stabilizer which is fastened to the frame. The movement limiter extends between the stop surfaces so that it shifts between them upon movement of the link arms. The cab's mobility is limited by the fact that contact occurs between the movement limiter and the stop surfaces.

18 Claims, 5 Drawing Sheets

ARRANGEMENT FOR CABS FOR VEHICLES

The present invention relates to an arrangement for driving cabs for vehicles of the kind indicated in the preamble to patent claim 1.

STATE OF THE ART

A known practice is to arrange springs, e.g. gas springs or coil springs, between the cab and frame of freight vehicles for the sake of greater comfort while the vehicle is in motion. The springs enable the cab to move between upper and lower endstops which limit cab movement relative to the frame not only during operation but also when the cab is tilted forward to render the engine, situated under the cab, accessible for servicing or repair. In cases where gas springs are used, the endstops are incorporated in the respective springs, which makes the springs expensive and complicated. As powerful forces act upon the endstops, particularly when the cab is tilted, strong spring mountings are also required for fastening the gas springs to the cab. The use of coil springs usually entails the use of a separate shock absorber associated with each spring, in which case the endstops are built into the shock absorber. Like gas springs, shock absorbers are complicated and require strong mountings capable of absorbing the large forces which occur in the spring arrangement during operation and upon tilting.

OBJECT OF THE INVENTION

The object of the present invention is to provide a solution which has the effect of eliminating the disadvantages mentioned above. This is achieved by the features of the invention which includes the cab being supporting by spring elements relative to the vehicle frame. At least one arm and usually two arms extend between the frame and the cab, following the springing movement of the vehicle cab. There are upper and lower stop surfaces at the frame which limit the springing movement of the cab. One end of the link arm is rotatably arranged relative to a supporting element fastened to the frame. The other end of the link arm is arranged in a resilient bushing, preferably a rubber bushing in the carrier element. The link arm is provided with a movement limiter which extends transverse to the longitudinal direction of the vehicle. The movement limiter extends between the top and bottom stop surfaces so that contact between the movement limiter and the stop surfaces which occurs upon movement of the link arm controls the extent of movement of the link arm and controls the tilting movement of the cab. The stop surfaces may be defined in an aperture extending through a carrier secured to the cab. There may be a stabilizer between the cab and the frame and the link arm may be a side piece of that stabilizer. Shock absorbing material may be provided on the movement limiter to damp the shocks when they move the limiter to contact the stop surfaces.

Applying the invention makes it possible to use a simpler gas spring or shock absorber without built-in endstops. It also makes it possible to use significantly less strong mountings, because the endstops being separate from the gas spring or shock absorber means that the mountings are subject to significantly smaller forces.

A preferred embodiment of the invention is described below with reference to the attached drawings.

DESCRIPTION OF AN EMBODIMENT

Figure 1:
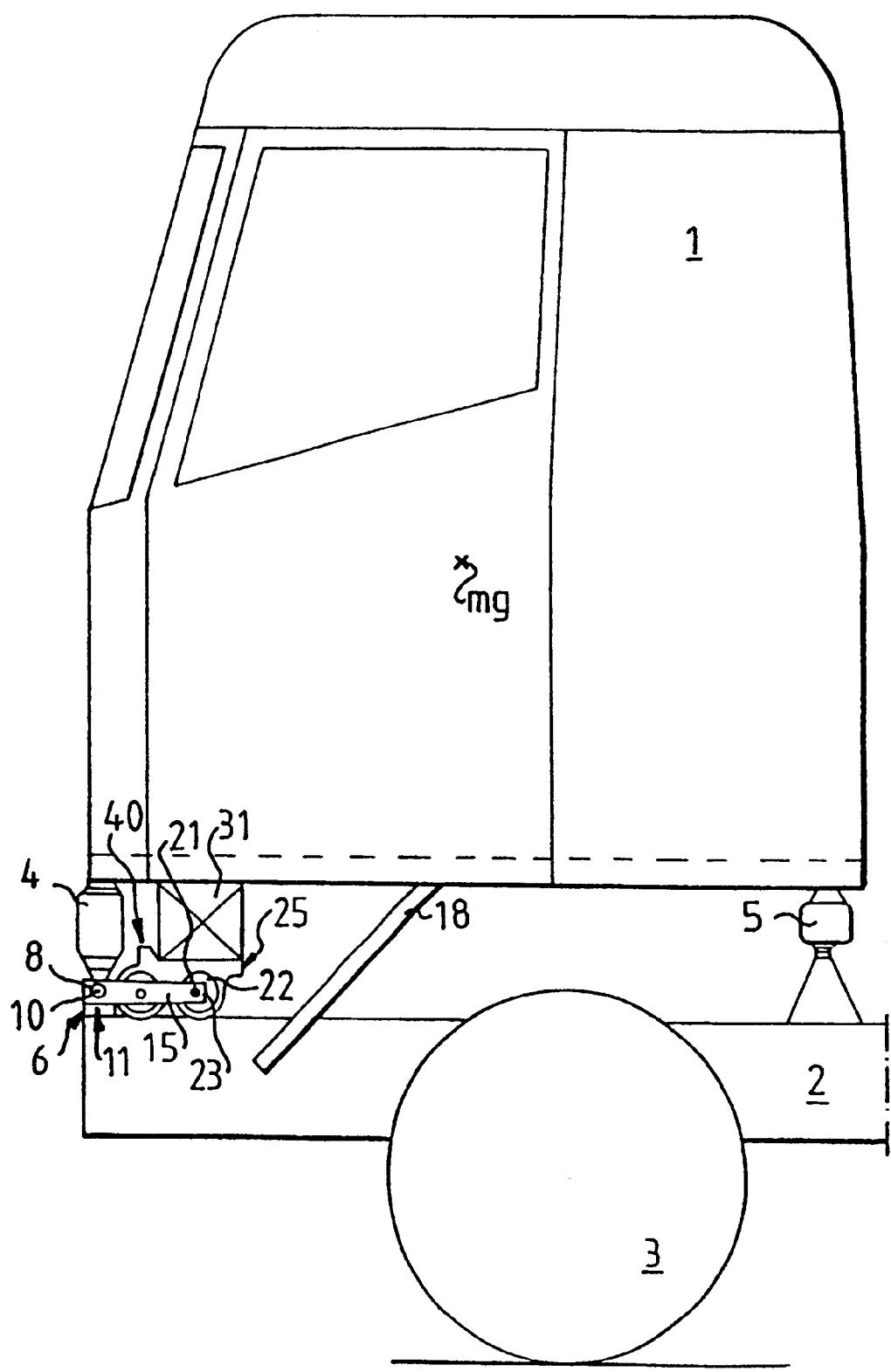
FIG. 1 depicts a driving cab balanced on forward and rear gas springs and with an arrangement according to the invention arranged between cab and frame.

FIG. 1 depicts schematically a sideview of a driving cab 1 for a freight vehicle together with the structure which supports the driving cab 1 on a chassis or frame 2 of the freight vehicle. The front pair of wheels are denoted by reference 3. The driving cab 1 is kept balanced by means of a number of gas springs, comprising in this embodiment two forward gas springs 4 and two rear gas springs 5. Both the rear and the forward gas springs are arranged approximately at the respective corners of the cab 1. The gas springs 4 and 5 are thus placed between the floor of the cab 1 and the frame 2.

Figures 2, 3:
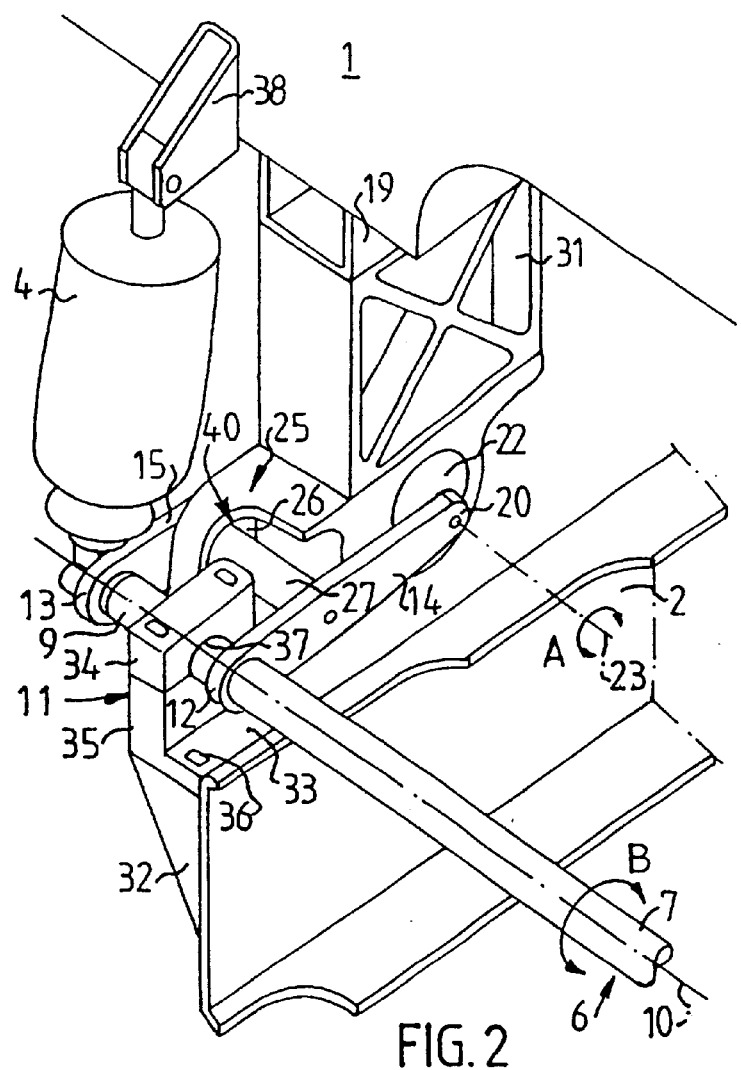
FIG. 2 depicts the arrangement according to the invention at a front corner of the cab.
FIG. 3 depicts a carrier element forming part of the arrangement according to the invention.

FIGS. 1 and 2 show a stabiliser 6 arranged between the cab 1 and the frame 2 in order to damp cab rolling motions. The stabiliser 6 incorporates a torque bar 7, one end 8 of which is depicted at a front corner of the cab in FIG. 1. The other end 9 of the torque bar 7 is depicted in FIG. 2 and is correspondingly situated at the other front corner of the cab. The torque bar 7 is arranged for rotation about its center line 10 in the direction B in a supporting element 11 which is arranged at each corner of the cab and which is firmly connected to the frame 2. One end 12, 13 of a number of link arms 14, 15 is arranged unrotatably at each end 8, 9 of the torque bar 7. The other end 20, 21 of each of the link arms 14, 15 is arranged in a rubber bushing 22 in a carrier element 25 which is firmly connected to the cab 1 via a spacing element 31. It is of course possible to fit the carrier element 25 directly to the cab 1 without an intermediate spacing element 31. The rubber bushing 22 allows a certain degree of relative rotation between the link arms 14, 15 and the carrier element 25 about the center line 23 of the rubber bushing 22 in the direction indicated by the arrow A. This means that the cab 1 can move respectively up and down somewhat at the front edge, depending on the prevailing conditions.

The carrier element 25 in which the rubber bushing 22 is arranged incorporates a device 40 for limiting the movements of the cab 1 relative to the frame 2. The device 40 is described later.

The cab 1 is tiltable between the working position depicted in FIG. 1 and a tilted position illustrated in FIGS. 6–11. The cab 1 is titled about the center line 10 of the torque bar 7 by means of a hydraulically operated lifting device 18 of the piston and cylinder type. One end of the lifting device 18 is fastened to the frame 2 and its other end is fastened to the cab 1 at a position somewhat forward of the cab's center of gravity mg.

FIG. 2 depicts in detail the front right corner of the cab with a device 40 according to the invention. A similar device is also to be found at the front left corner of the cab. The supporting element 11 is arranged on the outside of the frame 2 by means of a bracket 32. In this embodiment, the supporting device 11 takes the form of a straight block with a lower projection 33, but other shapes are also conceivable. The supporting element 11, which incorporates an upper portion 34 and a lower portion 35, is provided with a multiplicity of holes 36 to make fastening possible to the frame 2. The holes 36 are oval to cater for tolerance errors in the frame 2, thereby facilitating the fitting of the supporting element 11 to the frame 2. In the supporting element 11 there is a centrally situated aperture 37 through which the torque bar 7 of the stabiliser 6 extends.

An outer link arm 15 is arranged at the ends 8,9 of the torque bar 7. An inner link arm 14 is arranged on the torque bar 7 parallel with and at a certain distance from the outer link arm 15. The portion of the torque bar 7 which extends between the two link arms 14,15 is arranged for rotation relative to the supporting element 11 in a manner shown in more detail in FIGS. 4–5. The lower portion of the forward gas spring 4 is arranged at the far end of the torque bar 7, beyond the outer link arm 15. The upper portion of the gas spring 4 is fastened to the cab 1 by means of a spring bracket 38.

The carrier element 25 is situated in the space between the two link arms 14,15. The carrier element 25 has running through it a rubber bushing 22, on the respective sides of which the inner and outer link arms 14,15 are arranged via an undepicted fastening connection. Forward (in the vehicle's normal direction of movement) from the rubber bushing 22, the carrier element 25 has running through it a large aperture 26 through which extends a movement limiter 27, the respective ends of which are arranged in the inner and outer link arms 14,15. The movement limiter 27 is thus arranged perpendicular to the link arms 14,15 and extends transverse to the longitudinal direction of the vehicle.

FIG. 3 shows a more detailed diagram of the carrier element 25 according to the invention. The diagram shows the aperture 26 bounded by a rear wall 28, a forward wall 29, an upper stop surface 48 and a lower stop surface 49.

The extent a of the front wall 29 transverse to the direction of movement of the vehicle is smaller than the extent b of the remainder of the carrier element 25, which is somewhat smaller than the distance between the link arms 14,15. The reason for the forward wall 29 having a smaller width a than the remainder of the carrier element 25 is that the forward wall 29 has to be accommodated between the outer link arm 15 and the supporting element 11.

In this embodiment, the carrier element 25 is arranged on the floor member 19 of the cab 1 (FIG. 1) via a spacing element 31 but may equally well be arranged directly on the floor member 19. As different types of cab differ in height, the spacing element 31 makes it possible for identical suspension arrangements to be used irrespective of cab type.

FIG. 3 shows that the carrier element 25 has a nearly figure-of-eight longitudinal shape, with a flat top portion 51 which is provided with holes 52 for fastening the carrier element 25 to the floor member 19 or alternatively to the spacing element 31. The rear portion (in terms of the vehicle's normal direction of movement) of the carrier element 25 has an aperture 54 running through it. In this diagram the aperture 54 is circular in shape but other shapes are also conceivable. The aperture 54 is intended to accommodate the aforesaid rubber bushing 22. Forward from the rear aperture 54 is the forward aperture 26, the shape of which has been described in more detail with reference to FIG. 2. The movement limiter 27 extends through the forward aperture 26. The movement limiter 27 may consist of a pin made of metallic material. In an advantageous embodiment, an elastic material is arranged on the pin. The elastic material may be rubber or some other material with shock absorbing properties. The elastic material may take the form of a sheath drawn onto the pin or consist of bonded-on pieces of rubber or the like. The pieces of rubber are advantageously applied to the portions of the movement limiter which are intended to come into contact with the stop surfaces 48,49.

Figure 4:
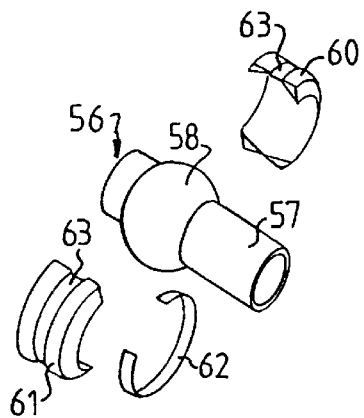
FIG. 4 depicts a stabiliser bearing forming part of the arrangement according to the invention.
Figure 5:
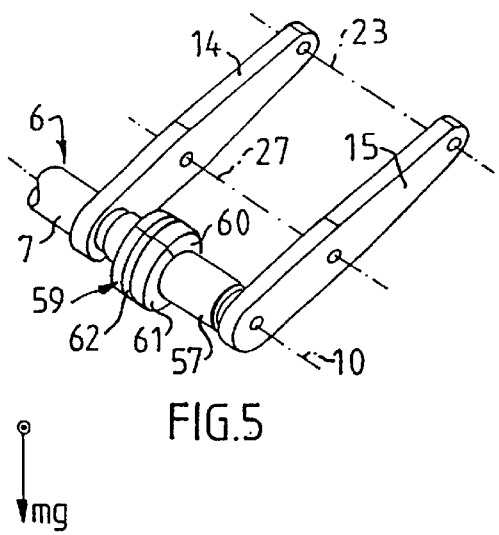
FIG. 5 depicts a stabiliser forming part of the arrangement according to the invention.
Figure 6:
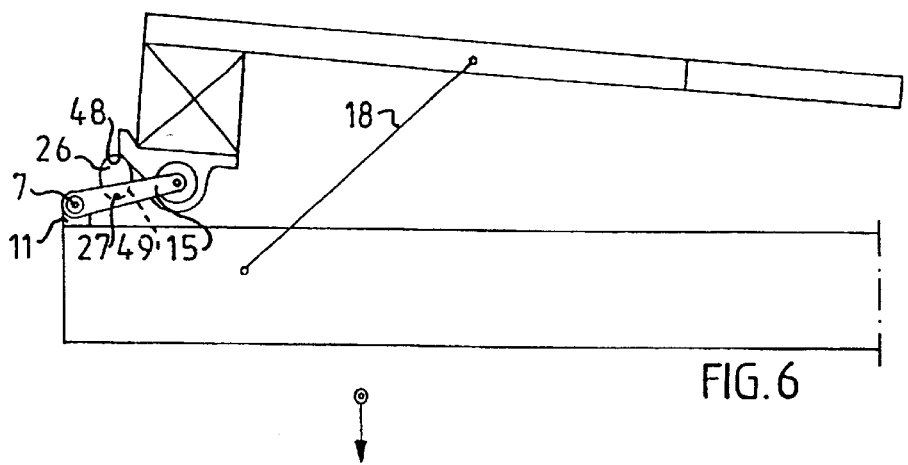
FIGS. 6–9 depict the arrangement according to the invention when the cab is tilted relative to the frame.

FIGS. 4 and 5 depict a stabiliser bearing 56 forming part of the arrangement according to the invention. The bearing 56 is arranged on the portion of the torque bar 7 which extends between the two link arms 14,15 and via which the stabiliser 6 is supported by the supporting element 11. The bearing 56 incorporates a sleeve 57 with spherical surface 58, which is fitted to the torque bar 7 of the stabiliser 6 and is secured by welding or some other suitable method. It also incorporates a bearing element 59. In this embodiment the bearing element 59 consists of two bearing halves 60,61, the insides of which co-operate with the spherical sleeve 58, which means that the torque bar 7 can rotate in the supporting element 11 when the cab 1 rolls and on the occasion of tilting of the cab 1 relative to the frame 2. Each bearing half 60,61 is provided with a groove 63 for a locking ring 62. Fitting the bearing halves 60,61 involves their being placed on the spherical sleeve 58 and being joined together by the locking ring 62 being fitted in a countersunk manner into the groove 63. The locking ring 62 consists of a ring with an opening, which means that it is somewhat resilient so that it can be opened out in order to stretch round the sleeve 57 and the bearing halves 60,61 while at the same time being tight enough to hold said bearing halves 60,61 together. In this embodiment, two separate bearing halves are used. It is of course possible to use a bearing element whose portions are connected to one another by some form of hinge. In an advantageous embodiment, bearing halves made of some plastic material are used.

FIG. 5 shows how the bearing 56 is placed on the torque bar 7 of the stabiliser 6, between the outer and inner link arms 14, 15. The bearing element 59 being detachably fastened makes it easy to replace if it becomes worn out, without having to remove any part of the stabiliser 6. FIG. 5 also shows the center line 23 of the otherwise undepicted rubber bushing and the center line 10 of the stabiliser 6, which is also the tilt axis of the cab 1 when the cab 1 is tilted between the working position and a tilted position. The diagram also depicts schematically the positioning of the movement limiter 27 between the two sidepieces 14,15.

The solution according to the invention works as follows.

As an arrangement according to the invention is arranged at each front corner of the cab, all that is here described is what happens at one corner of the cab, it being tacitly understood that the same also happens correspondingly at the other front corner of the cab.

As may be seen in FIG. 2, the movement limiter 27 is arranged firmly between the sidepieces 14,15 of the stabiliser 6 which is fastened to the frame. The movement limiter 27 extends through the aperture 26 depicted in FIG. 3. The aperture 26 is formed in the carrier element 25 which is fastened to the cab. When the cab 1 "springs", the movement limiter 27 will move upwards or downwards relative to the rear wall 28 and the forward wall 29 and thus approach or move away from the respective stop surfaces 48,49. When the vehicle travels over uneven surfaces or the cab is tilted, the movement limiter 27 or its elastic sleeve will come into contact with the respective endstops 48,49, whereupon the elastic material will damp the shocks which occur when these parts come into contact with one another.

What happens when the cab is tilted is as follows. The tilting process is initiated by the lifting device 18 being activated while at the same time the pressure in the forward gas spring 4 is reduced so that the gas spring 4 will not oppose the movements of the cab 1 during the tilting process. This pressure reduction and the pressure increase which takes place when the cab 1 is lowered to its original position are brought about by means of a conventional control arrangement which does not form part of the present invention and is therefore not described in more detail. As the point at which the lifting device 18 acts upon the cab 1 is situated somewhat forward from the center of gravity mg of the cab 1, the lifting device 18, during the initial stage of the tipping process, pushes the front end of the cab 1 upwards, resulting in the torque bar 7 rotating in the supporting element 11 so that the link arms 14, 15 swing upwards. As the cab 1 rises, the gas spring 4 is stretched while at the same time the movement limiter 27 comes into contact with the lower stop surface 49. The cab 1 thus assumes the position depicted in FIG. 6.

Figure 7:
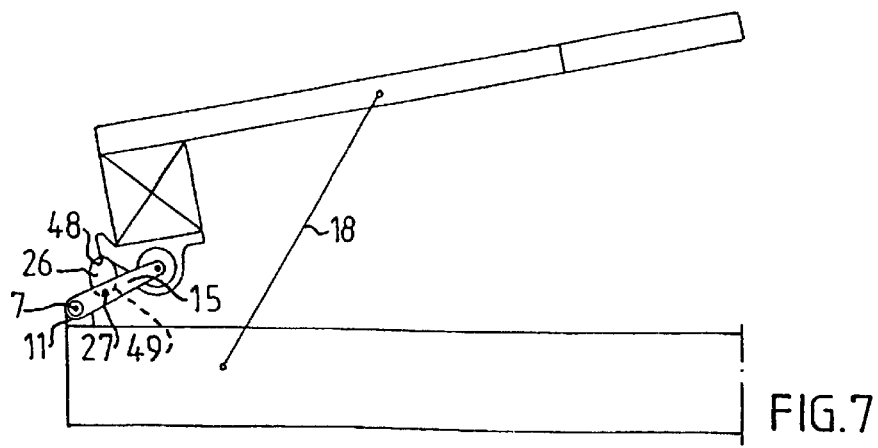

When the movement limiter 27 has come into contact with the lower stop surface 48, the tilting movement starts and the cab 1 tilts about the torque bar 7 of the stabiliser 6. During the tilting movement, the center of gravity mg of the cab 1 shifts successively forwards. In this embodiment, when the cab 1 has tilted about 4 degrees, the center of gravity has shifted so far forward that the cab 1 tends to fall forwards under its own weight. During the tilting movement, the gas spring 4 is compressed. FIG. 7 illustrates at cab 1 tilted to such an extent and tending to fall forwards under its own weight.

Figure 8:
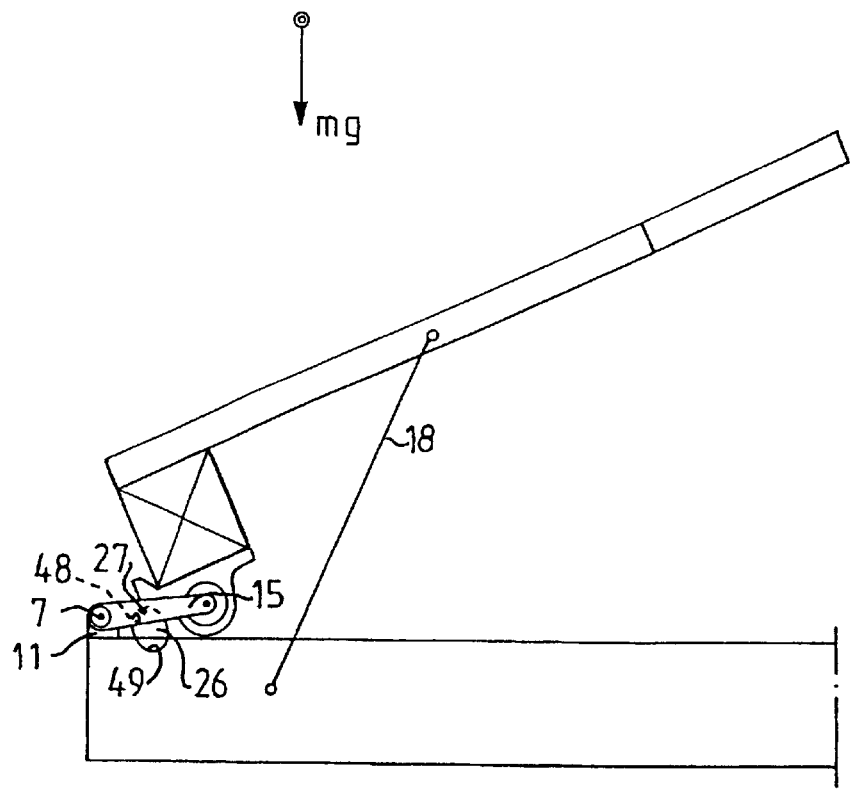

Continued action of the lifting device 18 causes the cab 1 to fall forwards until the movement limiter 27 comes into contact with the upper stop surface 48, as depicted in FIG. 8. In this embodiment the cab will now be at an angle of about 10 degrees relative to the frame 2. The fall to the position depicted in FIG. 8 takes place gradually. When the lifting device 18 has effected the lifting movement, the cab 1 falls a short distance before the falling movement ceases. For the cab 1 to fall a little further will require continued action of the lifting device 18, after which the cab will fall a few more degrees before being braked. After a number of elongations of the lifting device 18, the cab reaches the position depicted in FIG. 8.

Figure 9:
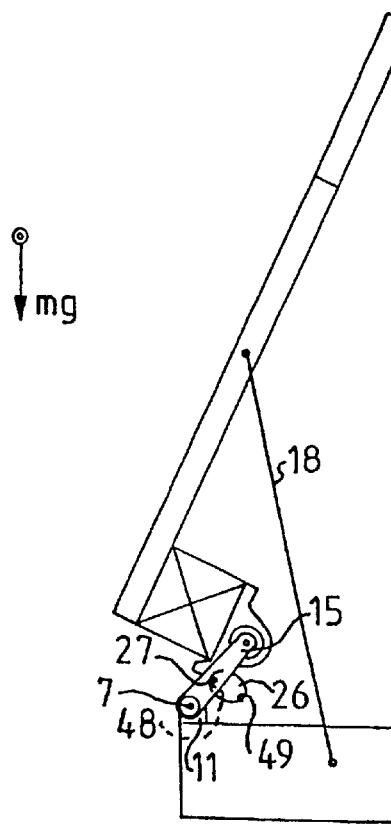

Continued action of the lifting device will tilt the cab 1 to the fully tilted position depicted in FIG. 9. In this embodiment the cab will then be at an angle of about 64 degrees relative to the frame.

Lowering the tilted cab 1 to its normal position involves the above process taking place in reverse order.

Figure 10:
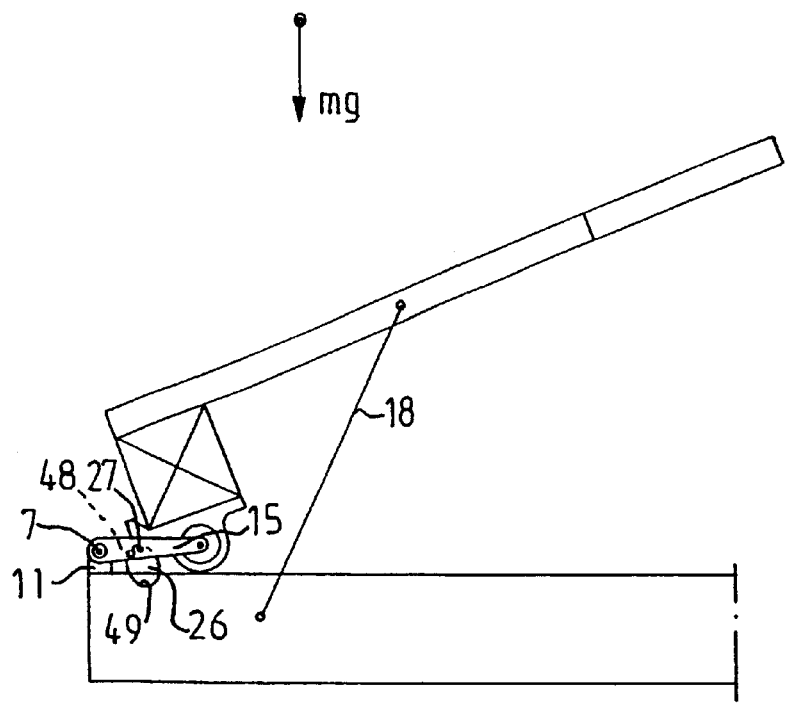
FIGS. 10–11 depict the arrangement according to the invention when the cab is lowered relative to the frame.
Figure 11:
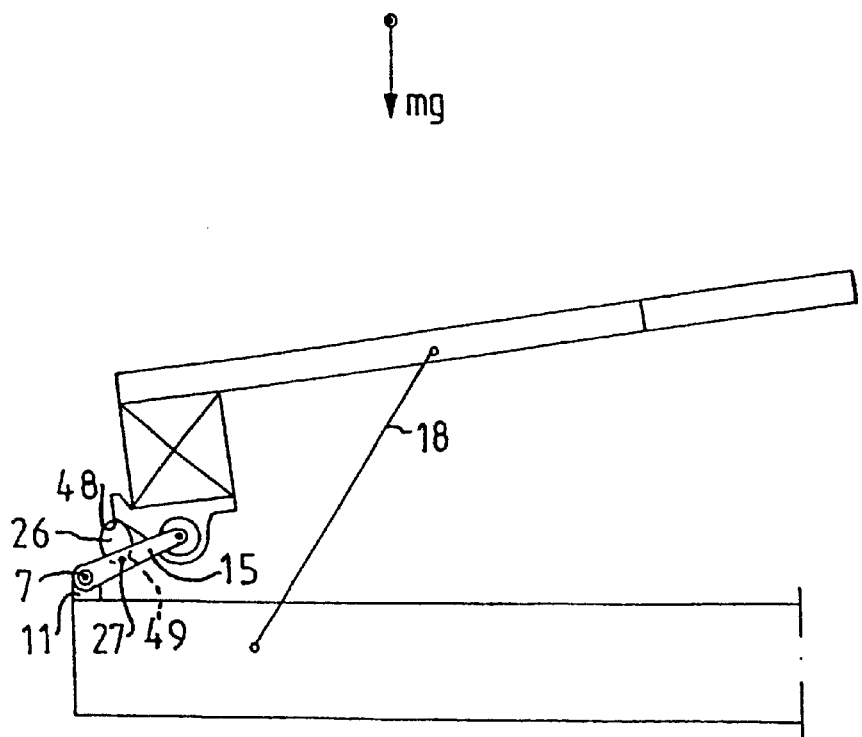

FIG. 10 shows that the movement limiter 27 abuts against the upper stop surface 48 until the cab 1 is lowered to about 21 degrees relative to the frame 2. Continued lowering tends to make the cab fall towards the frame 2 under its own weight but the fall is damped by the lifting device 18. During the lowering process, the movement limiter 27 gradually approaches the lower stop surface 49. When the cab 1 has been lowered to about 8 degrees, the movement limiter 27 will be in contact with the lower stop surface 49, as depicted in FIG. 11. The cab is lowered thereafter to the position depicted in FIG. 1.

The movement limiter 27 is also activated during operation of the vehicle in that it shifts upwards and downwards in the aperture 26 in the carrier element 25 according to the movements of the cab 1. When the vehicle is travelling on an even surface, the movement limiter 27 does not generally come into contact with the stop surfaces 48,49 but oscillates between them. If the surface is uneven, the movement limiter 27 may come into contact with the stop surfaces 48,49, thereby damping the movements of the cab.

The embodiment described above in no way limits the invention, which may also take forms other than that described above. For example, the movement limiter 27 need not be arranged on a stabiliser 6 but may also be arranged on any other element which extends between the frame 2 and the cab 1 in order to oscillate upwards and downwards according to the movements of the cab. Nor need the aperture 26 entirely surround the movement limiter 27, as it may be partly open, e.g. with a C-shaped longitudinal section, without departing from the concept of the invention.

What is claimed is:

1. An arrangement for controlling the tilting of a driving cab of a vehicle with respect to a frame of the vehicle, the arrangement comprising:

the vehicle frame, the driving cab; a plurality of spring elements resiliently supporting the driving cab on the frame;

a link connected with and between the frame and the cab for following the spring controlled movement of the cab; the link having a first region rotatably connected to the frame and having a second region spaced from the first region and attached to the cab;

a carrier element attached on the cab, a bushing in the carrier element to which the second region of the link is attached;

a movement limiter extending transversely to the longitudinal direction of the vehicle and attached to the link, whereby the movement limiter moves as the link moves;

at least first and second opposing and spaced apart stop surfaces supported on the cab, the movement limiter being movable in a space between the first and second stop surfaces and being selectively contactable with one or the other of the first and second stop surfaces or out of contact with both of the stop surfaces, such that the movement limiter extends between and may contact one of the stop surfaces upon movement of the link.

2. The arrangement of claim 1, wherein the bushing comprises a rubber bushing in the frame to which the second region of the link is attached.

3. The arrangement of claim 2, further comprising a carrier element permanently attached at the cab, the rubber bushing being in the carrier element, and the stop surfaces being defined in the carrier element.

4. The arrangement of claim 3, wherein the carrier element has an aperture therethrough with opposite top and bottom surfaces; and the first and second stop surfaces being defined in the aperture at the opposite top and bottom surfaces.

5. The arrangement of claim 1, further comprising a stabilizer between the cab and the frame for damping cab rolling motion.

6. The arrangement of claim 5, wherein the link comprises a side piece of the stabilizer.

7. The arrangement of claim 6, wherein there are two of the links, the stabilizer has opposite sides and the links comprise the respective opposite sides of the stabilizer.

8. The arrangement of claim 1, wherein the movement limiter extends perpendicular to the links.

9. The arrangement of claim 8, wherein the movement limiter comprises a pin of metal.

10. The arrangement of claim 1, further comprising shock absorbing material on the movement limiter and adapted for damping shock which occurs as the movement limiter contacts one of the stop surfaces.

11. An arrangement of claim 1, wherein there are two of the links which extend parallel to each other and the movement limiter extends between the two links.

12. The arrangement of claim 4, wherein the carrier element aperture is also bounded by a front surface and an opposite rear surface and the top, bottom, front and rear surfaces together enclose the aperture.

13. The arrangement of claim 7, wherein the width of the front surface is narrower than the width of the rear surface of the aperture.

14. The arrangement of claim 3, wherein the carrier element generally has a figure eight shape and a generally flat top side for being fastened to the cab, the cab having a floor to which the flat top side of the carrier element is attached.

15. The arrangement of claim 1, wherein there are two of the links spaced apart and the carrier element extends between the links.

16. The arrangement of claim 1, further comprising a torque bar at the vehicle frame to which the one end of the link is attached.

17. The arrangement of claim 1, wherein the link comprises an arm with opposite ends at which the first and second regions are respectively opened.

18. The arrangement of claim 17, wherein there are two of the link arms which extend parallel to each other and the movement limiter extends between the two link arms.

* * * * *